United States Patent
Shi et al.

(10) Patent No.: US 10,312,582 B2
(45) Date of Patent: Jun. 4, 2019

(54) CLOSED LOOP APERTURE TUNABLE ANTENNA

(71) Applicant: Futurewei Technologies, Inc., Plano, TX (US)

(72) Inventors: Ping Shi, Santa Clara, CA (US); Yonghua Wei, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 282 days.

(21) Appl. No.: 15/167,279

(22) Filed: May 27, 2016

(65) Prior Publication Data
US 2017/0346178 A1    Nov. 30, 2017

(51) Int. Cl.
*H01Q 9/00* (2006.01)
*H01Q 1/50* (2006.01)
*H04B 17/10* (2015.01)
*H04B 17/12* (2015.01)

(52) U.S. Cl.
CPC ............ *H01Q 1/50* (2013.01); *H04B 17/102* (2015.01); *H04B 17/12* (2015.01)

(58) Field of Classification Search
CPC ............ H03H 7/40; H01Q 1/50; H04B 17/02
USPC .................................................. 343/745, 861
See application file for complete search history.

(56) References Cited

U.S. PATENT DOCUMENTS

| | | | |
|---|---|---|---|
| 2009/0046030 A1 | 2/2009 | Song et al. | |
| 2012/0112852 A1 | 5/2012 | Manssen et al. | |
| 2012/0295554 A1 | 11/2012 | Greene et al. | |
| 2013/0069737 A1 | 3/2013 | See et al. | |
| 2013/0187828 A1* | 7/2013 | Desclos | H01Q 1/50 343/861 |
| 2013/0187829 A1 | 7/2013 | Pajona | |
| 2013/0201067 A1 | 8/2013 | Hu et al. | |
| 2015/0065063 A1 | 3/2015 | Peltonen | |
| 2015/0065066 A1 | 3/2015 | Kang | |

(Continued)

FOREIGN PATENT DOCUMENTS

| | | |
|---|---|---|
| CN | 102437835 | 5/2012 |
| CN | 103380576 | 10/2013 |

(Continued)

OTHER PUBLICATIONS

"International Application No. PCT/CN2017/085578, International Search Report and Written Opinion dated Aug. 18, 2017", (Aug. 18, 2017), 13 pgs.

(Continued)

*Primary Examiner* — Peguy Jean Pierre
(74) *Attorney, Agent, or Firm* — Schwegman Lundberg & Woessner, P.A.

(57) ABSTRACT

An apparatus comprises a radio frequency (RF) antenna circuit; an antenna aperture tuning circuit; an antenna impedance measurement circuit; and a processor circuit electrically coupled to the tunable antenna aperture circuit and the impedance measurement circuit. The processor circuit is configured to: set the antenna aperture tuning circuit to an antenna aperture tuning state according to one or more parameters of an RF communication network; initiate an antenna impedance measurement; and change the antenna aperture tuning state to an antenna aperture tuning state indicated by the antenna impedance.

17 Claims, 5 Drawing Sheets

(56) References Cited

U.S. PATENT DOCUMENTS

| | | | |
|---|---|---|---|
| 2015/0119045 A1* | 4/2015 | Montgomery | H01Q 5/22 |
| | | | 455/437 |
| 2015/0372656 A1 | 12/2015 | Mow et al. | |
| 2016/0126618 A1* | 5/2016 | Strange | H01Q 1/50 |
| | | | 343/861 |
| 2016/0126619 A1* | 5/2016 | Tenbroek | H03H 7/40 |
| | | | 343/745 |

FOREIGN PATENT DOCUMENTS

| | | |
|---|---|---|
| CN | 103545600 | 1/2014 |
| CN | 103828247 | 5/2014 |
| CN | 103931051 | 7/2014 |
| CN | 104426575 | 3/2015 |
| CN | 104871459 | 8/2015 |
| EP | 3016289 A1 | 5/2016 |
| EP | 2688144 | 10/2016 |
| JP | 2014241724 | 12/2014 |
| JP | 5819502 | 11/2015 |

OTHER PUBLICATIONS

"European Application Serial No. 17802159.8, Supplementary European Search Report dated Jan. 25, 2019", 10 pgs.

Shah, Sameer A., et al., "A Novel Approach to Design an Antenna Aperture Tuning Circuit", Asia-Pacific Microwave Conference (APMC), IEEE, vol. 2, (2015), 3 pgs.

* cited by examiner

CLOSED LOOP APERTURE TUNABLE ANTENNA

BACKGROUND

Radio access networks are used for delivering data, voice and video communications to devices such as cellular telephones, smart phones, tablet computers, etc. These devices are often included within metallic cases, which creates a challenge to design an antenna for the devices that provides the capability desired by users of the devices. The metallic cases can act as a shield that prevents electromagnetic energy from reaching the antenna. Thus, there are general needs for devices, systems and methods that provide robust communication in radio access devices that provides a satisfactory experience for the user.

SUMMARY

Embodiments pertain to portable electronic devices that communicate using radio access networks. These devices are increasingly being designed with metallic cases. However, metallic cases for such devices can create challenges for antenna design. The more the device is encased in metal, the more difficult it is to provide enough volume for an effective antenna design. Additionally, changes in orientation of the devices by a user and the way a user interacts with the devices (sometimes called "use cases") further complicate antenna design.

The present subject matter provides an aperture tunable antenna to address these issues. To tune the antenna aperture an antenna aperture tuning circuit is provided. The antenna aperture tuning circuit may include or more RF switches. The RF switches can be coupled between a radiating element of the antenna and a circuit component, such as one or more of an inductor, capacitor, another radiating element of the antenna, and circuit ground for example. The antenna aperture tuning state can be changed by changing the configuration of the RF switches.

In some embodiments, antenna impedance is obtained and it is determined if the current antenna aperture tuning state is the desired or optimum tuning state for that impedance. If not, the device changes its antenna tuning state accordingly. This creates closed loop control of the antenna aperture tuning state based on antenna impedance.

An apparatus embodiment includes a radio frequency (RF) antenna circuit; an antenna aperture tuning circuit; an antenna impedance measurement circuit; and a processor circuit electrically coupled to the tunable antenna aperture circuit and the impedance measurement circuit. The processor circuit is configured to: set the antenna aperture tuning circuit to an antenna aperture tuning state according to one or more parameters of an RF communication network; initiate an antenna impedance measurement; and change the antenna aperture tuning state to an antenna aperture tuning state as a function of the antenna impedance.

A method embodiment includes setting an antenna aperture tuning state according to one or more parameters of the RF communication network; determining antenna impedance; and changing the antenna aperture tuning state to an antenna aperture tuning state indicated by the determined antenna impedance.

This section is intended to provide a brief overview of subject matter of the present patent application. It is not intended to provide an exclusive or exhaustive explanation of the invention. The detailed description is included to provide further information about the present patent application such as a discussion of the dependent clams and the interrelation of the dependent and independent claims in addition to the statements made in this section.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
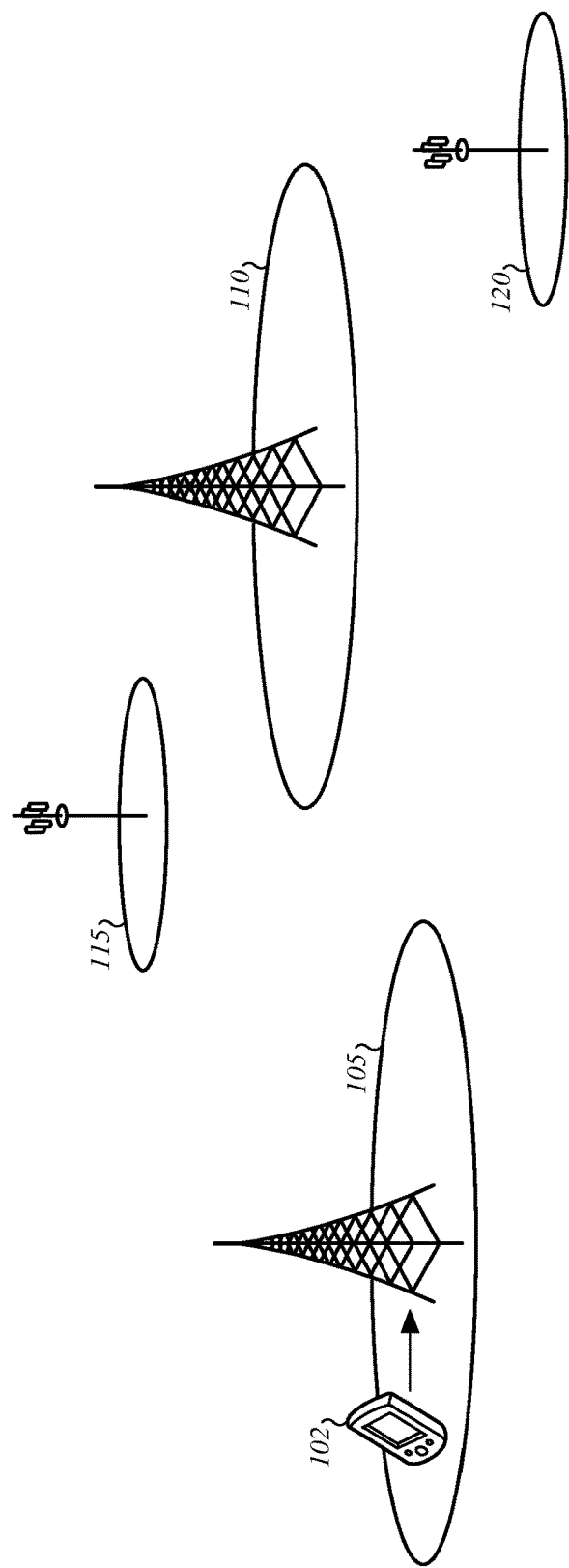
FIG. 1 is a graphical representation of portions of an example of a cellular communication network.

FIG. 1 illustrates an example of portions of a cellular communication network. In certain embodiments, the network is a Universal Mobile Telecommunications System (UMTS) network. The network 100 can include macro cells 105, 110 that service larger areas and can include smaller cells 115, 120 that service smaller areas. FIG. 1 also illustrates user equipment (UE) 102 operating in the network. The UE 102 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

Figure 2:
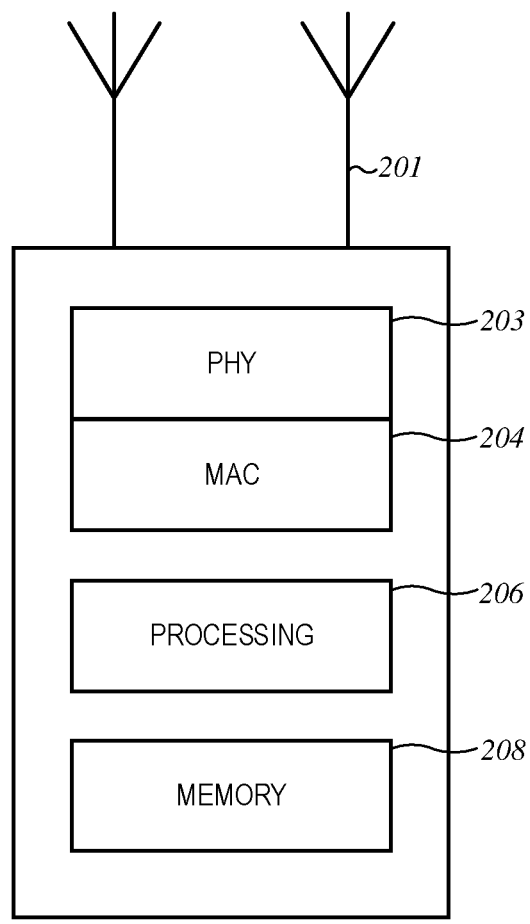
FIG. 2 is a functional block diagram illustrating user equipment for a cellular communication network.

FIG. 2 illustrates a functional block diagram of UE for a cellular communication network. The UE may be suitable for use as any one or more of the UEs 102 illustrated in FIG. 1. The UE may include physical layer (PHY) circuitry 203 for transmitting and receiving radio frequency electrical signals to and from one or more nodes of a radio access network using one or more antennas 201. The PHY circuitry 203 may include circuitry for modulation/demodulation, upconversion/downconversion, filtering, amplification, etc. The UE may also include medium access control layer (MAC) circuitry 204 for controlling access to the wireless medium and to configure frames or packets for communicating over the wireless medium. The UE may also include processing circuitry 206 and memory 208 arranged to configure the various elements of the UE to perform the operations described herein. The memory 208 may be used to store information for configuring the processing circuitry 206 to perform the operations.

Although the UE is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of radio frequency (RF) signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Figure 3:
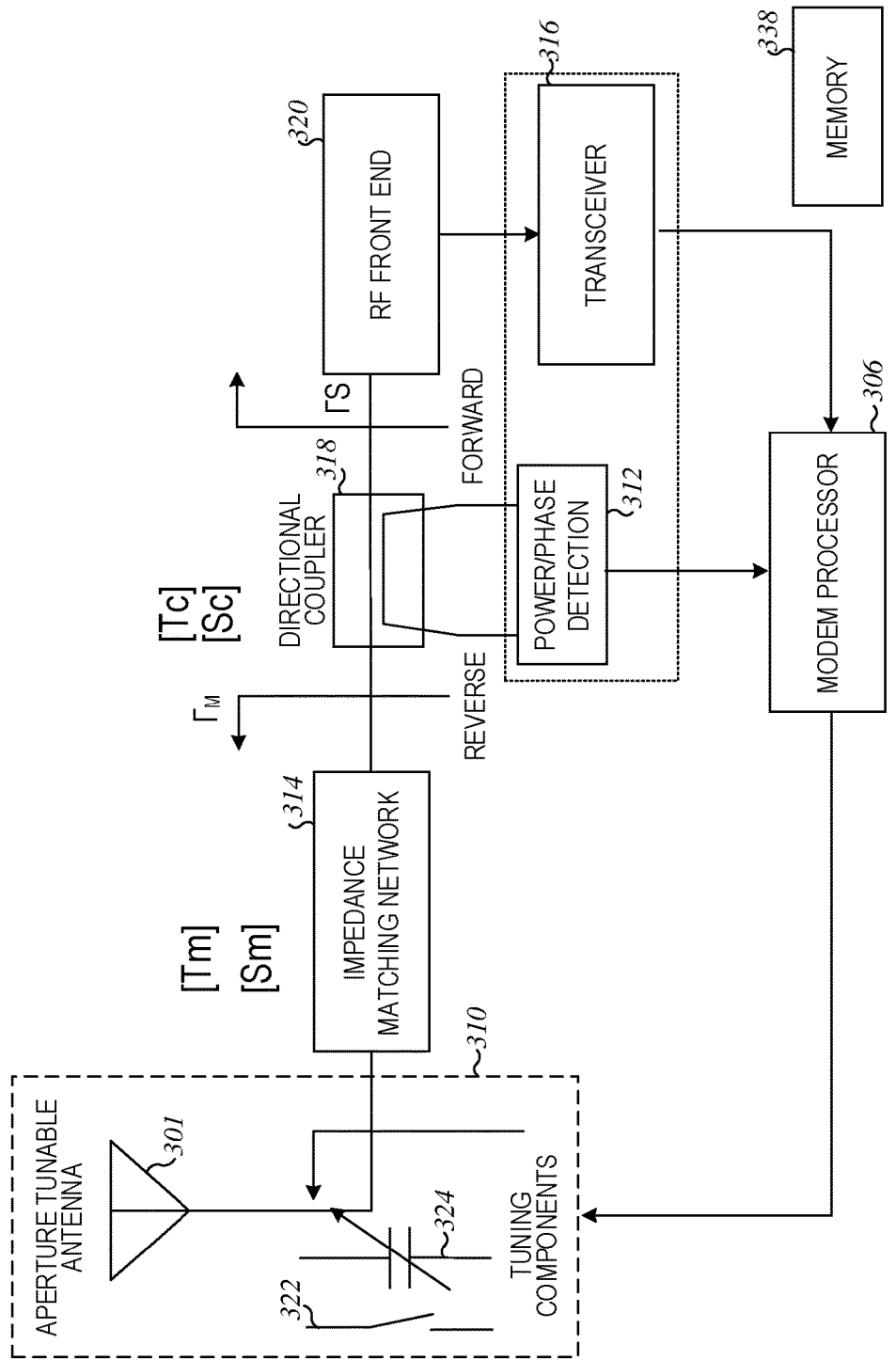
FIG. 3 is a block diagram of portions of an embodiment of an RF communication device.

FIG. 3 is a block diagram of portions of an embodiment of an RF communication device, such as UE for a cellular communication network for example. The device 300 includes an RF antenna circuit 301, an antenna aperture tuning circuit 310, and a processor circuit 306. The device 300 also includes an antenna impedance measurement circuit that includes a power phase and amplitude detector 312. Also shown in FIG. 3 are an impedance matching network 314 circuit, an RF transceiver 316, a directional coupler 318, and an RF front end 320. The RF front end 320 includes the RF filters used to reject an out of band signal when transmitting and receiving RF signals. As shown in FIG. 3, the antenna aperture tuning circuit 310 can include or more RF switches 322 and can include one more tunable capacitors 324. The RF switches 322 can be coupled between a radiating element of the antenna 301 and a circuit component, such as one or more of an inductor, capacitor, another radiating element of the antenna, and circuit ground for example. The one or more tuning capacitors 324 can be coupled between a radiating element of the antenna 301 and either another radiating element of the antenna or a circuit ground.

Figure 4:
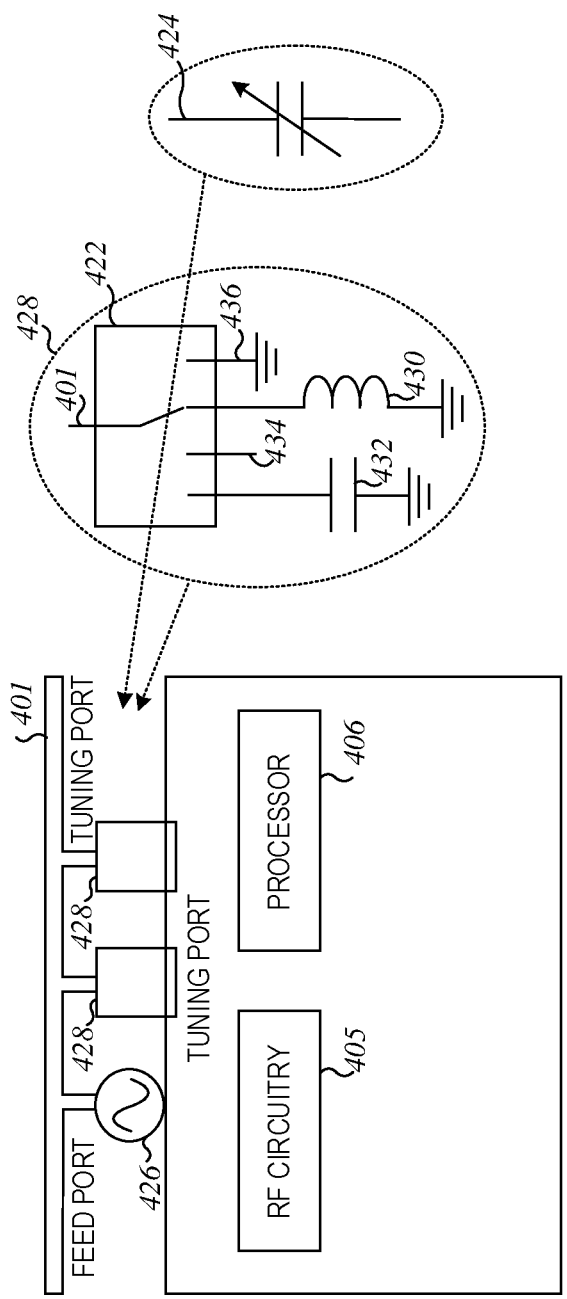
FIG. 4 is a block diagram of portions of an embodiment of an antenna aperture tuning circuit

FIG. 4 is a block diagram of portions of an embodiment of an antenna aperture tuning circuit 410. An antenna radiating element 401 is connected to RF circuitry 405 at feed port 426 and by one or more tuning ports 428 separate from the feed port 426. The RF circuitry 405 can include one or more of the RF circuitry blocks shown in FIG. 3. As shown in detail in FIG. 4, a tuning port 428 can include one or more of an inductor 430 coupled between the antenna radiating element 401 and circuit ground by an RF switch 422, a capacitor 432 coupled between the antenna radiating element 401 and circuit ground by an RF switch 422, at least a second antenna radiating element 434 coupled to the first antenna radiating element 401 by an RF switch 422, and a circuit ground 436 coupled to the antenna radiating element 401 by an RF switch 422.

In the embodiment shown, the tuning port includes a single-pole four-throw (SP4T) switch to connect the antenna radiating element 401 to one of the inductor 430, the capacitor 432, the second antenna radiating element 434, or the circuit ground 436. In certain embodiments, the tuning port 428 can include a different RF switch configuration to connect one or a combination of the inductor, the capacitor, the second radiating element and the circuit ground to the antenna radiating element 401. A processor 406 (e.g., a modem processor) is connected to the RF switches. The antenna aperture tuning state is changed by the processor 406 changing the configuration of the RF switch or switches.

In some embodiments, the antenna aperture tuning state is set using a tunable capacitor 424. In certain variations, the overall capacitance of a tunable capacitor can be adjusted or tuned or by adding or removing unit sized capacitors to the tunable capacitor circuit. In other variations, the overall capacitance could be tuned by changing the biasing voltage to the dielectric material of the capacitor. A tuning port 428 can include one or both of: the antenna radiating element 401 coupled to circuit ground by a tunable capacitor, and a second antenna radiating element coupled to the first antenna radiating element 401 by a tunable capacitor 424. The tunable capacitor could be replaced by a circuit consisting of a tunable capacitor connected in series with an inductor, connected in parallel with an inductor, or a combination of serial and parallel connections with one or more inductors. The processor 406 sets the antenna aperture tuning state by setting the capacitance value of one or more tunable capacitors of the tuning port or ports. The tuning ports 428 may include both RF switches and tuning capacitors. In some embodiments, the antenna aperture tuning circuit 410 includes one or more tuning ports with a combination of components switchable to the antenna radiating element by one or more RF switches 422 and components electrically coupled to the antenna radiating element 401 by one or more tunable capacitors 424. The processor 406 changes the antenna aperture tuning state by changing the capacitance value of one or more tunable capacitors and activating/deactivating one or more RF switches.

Returning to FIG. 3, the desired antenna aperture tuning state is determined according to antenna impedance measured by the antenna impedance measurement circuit. As explained previously herein, the impedance measurement circuit measures the complex reflection coefficient (N) at the reference plane. The impedance measurement circuit may include the power phase and amplitude detector 312. To measure antenna impedance, an RF signal is transmitted and the forward signal and the reverse signal are extracted using the directional coupler 318. The amplitudes of the forward and reverse signals (or the ratio of the amplitudes of the forward and reverse signals), and the relative phase between the forward signal and reverse signal are measured. The complex reflection coefficient ($\Gamma_M$) may be determined from the ratio of the amplitudes and the relative phase, and the impedance at the reference plane is derived using the reflection coefficient. The impedance matching network 314 may be de-embedded to derive the raw impedance ($\Gamma_{ANT}$). The de-embedding could be analytical and completed in real-time or runtime using a current circuit model (or two-port network mathematical model) of the impedance matching network. The de-embedding may be implicit in a lookup table based implementation where the effect of the impedance matching network 314 may be predetermined and accounted for in the calculations.

In some embodiments, there are two separated signal paths to the power phase and amplitude detector 312 for the forward and reverse signals. This allows the forward signal and the reverse signal to be extracted using the directional coupler 318 and the forward reverse signals to be measured simultaneously. In other embodiments, the forward signal and the reverse signal are extracted and measured sequentially. In some embodiments, the detection circuit is a differential detection circuit and the simultaneously extracted forward and reverse signals are fed into the differential detection circuit to obtain a ratio of the amplitudes and the relative phase. In other embodiments, the amplitude determinations for the forward and reverse signal are performed separately, and the ratio of the amplitudes is computed based on the detected values. The phase detection is realized by correlating the extracted forward/reverse signal with a transmit reference signal (or I/Q signal). The detected phase of each of the forward signal and the reverse signal are compared to obtain the relative phase between the forward signal and the reverse signal. The amplitude and phase detection could be realized in a discrete circuit implemented using one or both of analog and digital circuits, or the detection could be integrated into the RF transceiver utilizing the modem processor and completed in the digital domain.

When the antenna raw impedance is obtained, it is determined if the current antenna aperture tuning state is the desired or optimum state for that impedance. If not, the processor circuit 306 changes the antenna aperture tuning state accordingly. This creates a closed loop control of antenna aperture state based on antenna impedance. A lookup table can be used to map the antenna aperture tuning states available to predetermined antenna impedances. The lookup table may be stored in a memory circuit 338 separate from, or integral to, the processor circuit 306.

Table 1 below is an example of potions of a lookup table. In the left-most column of Table 1 are antenna aperture tuning states that correspond to the present tuning state of the device. Included for each tuning state are multiple impedance ranges. For example, the impedance ranges for Tuning State 1 are Impedance Range 11, Impedance Range 12, Impedance Range 13 . . . Impedance Range 1N. The impedance ranges for Tuning State 2 are Impedance Range 21, Impedance Range 22, Impedance Range 23 . . . Impedance Range 2N. The impedance ranges for Tuning State N are Impedance Range N1, Impedance Range N2, Impedance Range N3 . . . Impedance Range NN.

TABLE 1

| Aperture Tuning State | | Lookup Table | | | | |
|---|---|---|---|---|---|---|
| Tuning State 1 | Antenna Impedance | Range 11 | Range 12 | Range 13 | . . . | Range 1N |
| | Next Tuning State | 1 | 1 | 2 | . . . | 1 |
| Tuning State 2 | Antenna Impedance | Range 21 | Range 22 | Range 23 | . . . | Range 2N |
| | Next Tuning State | 2 | 1 | 2 | . . . | 2 |
| . . . | . . . | . . . | . . . | . . . | . . . | . . . |
| Tuning State N | Antenna Impedance | Range N1 | Range N2 | Range N3 | . . . | Range NN |
| | Next Tuning State | . . . | . . . | . . . | . . . | . . . |

The lookup table maps the present Tuning State and the determined antenna impedance to the desired tuning state. The lookup table may indicate that the present tuning state is the best tuning, or the lookup table may indicate that a different tuning state is the best tuning state. For instance, if the present tuning state is Tuning State 1 and the antenna impedance fall into impedance range 11, the lookup table indicates that Tuning State 1 is the best antenna aperture tuning state and the tuning state is not changed. If the present tuning state is Tuning State 1 and the antenna impedance fall into impedance range 13, the lookup table indicates that Tuning State 2 is the best antenna aperture tuning state and the tuning state is changed to Tuning State 2.

The Tuning States of Table 1 may correspond to a configuration of RF switches, a configuration of settings for one or more tunable capacitors or tunable inductors, or any combination of RF switch configurations, capacitor configurations, and inductor configurations. The number of antenna aperture tuning states that can be configured may exceed the number of aperture tuning states that are actually usable or desirable. A Tuning State of Table 1 may be mapped to a specific circuit configuration, such as by using a lookup table for example. The mapping may be incorporated into a single lookup table that includes the impedance mapping or a separate lookup table can be specifically used for the configuration mapping.

Table 2 below is an example of a lookup table to map Tuning States to actual circuit configurations. A Tuning State value is mapped to a row that includes a digital value that can be used to set the antenna aperture tuning state. For instance, assume the antenna aperture tuning state is determined by the SP4T RF switch 422 in FIG. 4. The digital value can be used to set the position of the RF switch 422 to couple the antenna radiating element 401 to one of the inductor 430, the capacitor 432, the additional antenna radiating element 434, or the circuit ground 436. The entries of Table 2 may be incorporated into Table 1 by expanding the Tuning State rows to include the circuit configuration settings. When a new Tuning is determined using the antenna impedance value, the digital for the circuit configuration may be loaded and used to re-configure the antenna aperture tuning state.

TABLE 2

| Tuning State | | | | |
|---|---|---|---|---|
| 1 | 1 | 0 | 0 | 0 |
| 2 | 0 | 1 | 0 | 0 |
| 3 | 0 | 0 | 1 | 0 |
| 4 | 0 | 0 | 0 | 1 |

The example lookup tables are intended to be illustrative and non-limiting. The antenna aperture tuning state may include more configurable options resulting in more entries in the lookup table. For instance, each of the circuit components may be connectable to the antenna radiating element 401 by an individually controllable RF switch 422. If the antenna aperture tuning circuit includes one or more tunable capacitors 424 as described previously herein, the digital value of a row of the lookup table can be used to set the capacitance value of the tunable capacitor. In further embodiments, an equation or other means may be used to obtain the antenna aperture tuning state, but the lookup table is likely sufficient and effective for this purpose.

Changing the antenna aperture tuning state can be viewed as a coarse adjustment of antenna performance or efficiency. Returning to FIG. 3, the impedance matching network 314 may be tunable to provide a fine adjustment for the antenna. A tunable impedance matching network may include one or more of a tunable shunt capacitor coupled between an antenna radiating element and ground, a tunable capacitor serially coupled between radiating antenna elements, a tunable inductor coupled in serial or shunt configuration, and one or more RF switches coupled to a capacitor or inductor. The processor circuit 306 changes the impedance of the impedance matching circuit by changing one or more of a capacitance value of an tunable capacitor, an inductance value of a tunable inductor, and a state of one or more RF switches of the impedance matching circuit 314.

Once the antenna aperture tuning state is configured by the processor circuit 306, the processor circuit 306 may adjust the impedance matching network 314 to optimize a figure of merit of the antenna, such as by tuning the impedance matching circuit to increase the transducer gain of the impedance matching circuit 314. Thus, the tuning by the processor circuit 306 can provide closed loop coarse tuning and closed loop fine tuning of the antenna circuit. The processor circuit 306 may continue to make the fine adjustments and continue to monitor the antenna raw impedance. When the antenna raw impedance changes to a new impedance value or a new impedance range that changes the entry in the lookup table, the processor circuit 306 loads and configures the new antenna aperture tuning state.

Figure 5:
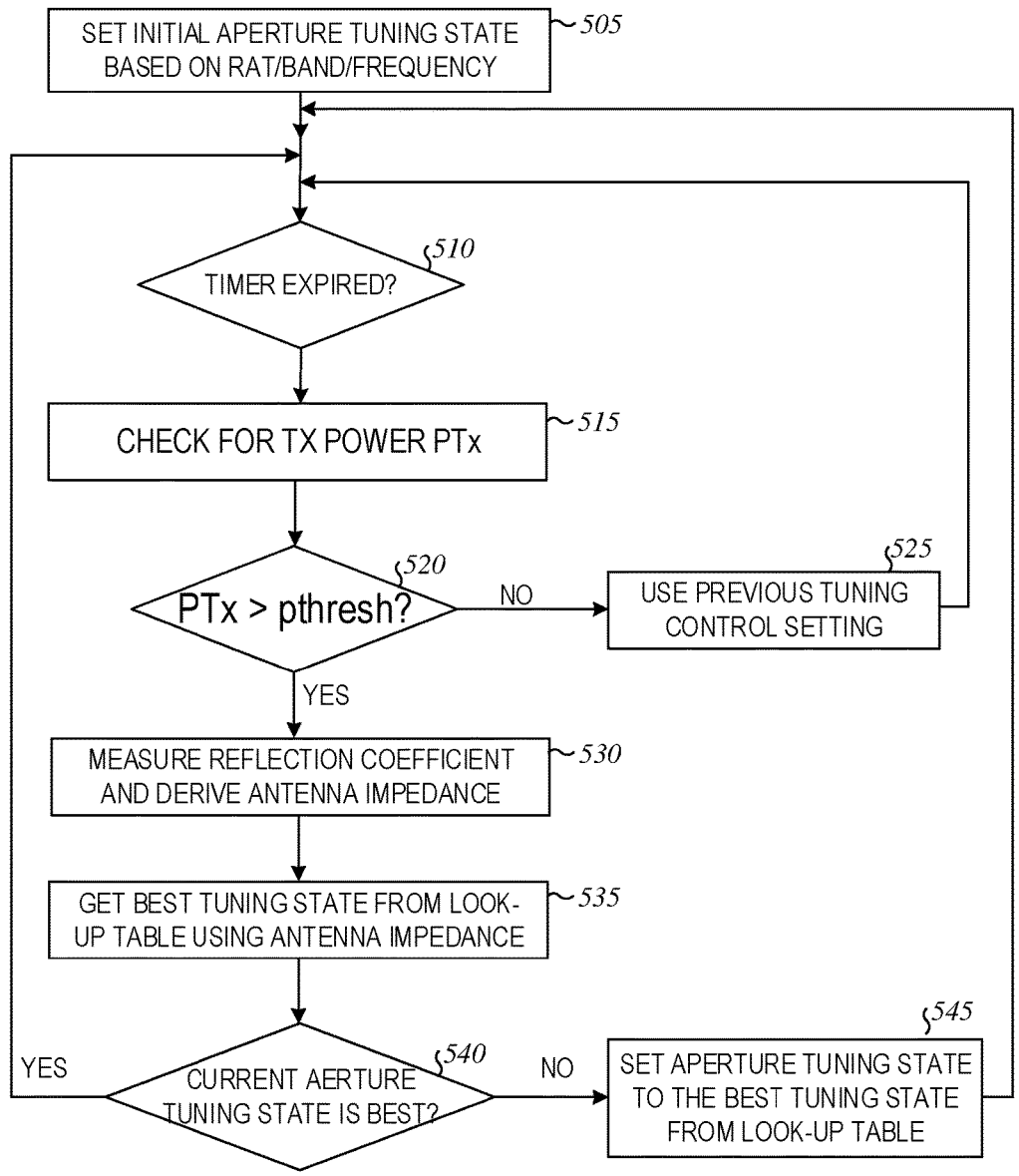
FIG. 5 is a flow diagram of an embodiment of a method of antenna aperture tuning for an RF communication device.

FIG. 5 is a flow diagram of an embodiment of a method 500 of antenna aperture tuning for an RF communication device. At 505, an initial or current antenna aperture tuning state is set according to one or more parameters of the RF communication network. Some examples of the network parameters include a radio access technology (RAT) of the RF communication network, a channel frequency band of the RF communication network, and bandwidth of the RF communication network. The antenna aperture tuning state can be set by configuring tunable capacitors, tunable inductors and RF switches as described previously.

The next step is to determine the antenna impedance and determine whether the current antenna aperture tuning state is the best one suited for the measured impedance. A processor may recurrently initiate the measurement of antenna impedance according to a specified schedule. In some embodiments, the measurement of antenna impedance may be initiated when a parameter of the RF communication network changes.

At 510, it is determined whether a timer expired to initiate the next antenna impedance measurement. The antenna impedance can be measured using a forward signal and a reverse signal of a transmit signal, such as described previously. At 515, it is determined whether the power of the transmit signal ($P_{TX}$) is strong enough for an accurate impedance measurement.

At 520, if the transmit power is less than a specified threshold power, the current aperture tuning state is maintained at 525 and the process waits until it is time for another antenna impedance measurement. If the transmit power satisfies the specified threshold power, at 530 the antenna impedance is derived, such as by determining the reflection coefficient from forward and reverse signals as described previously and deriving the antenna impedance using the reflection coefficient.

At 535, the best antenna aperture tuning state is determined according to the measured antenna impedance, such as by using a lookup table. At 540, if the best antenna aperture tuning state is the same as the current antenna aperture tuning state according to the measured antenna impedance, the process returns to 510 to wait for the next antenna impedance measurement to be initiated. Which aperture is best may depend on the current use case of the device, such as whether the device is being used in free space (FS), beside the head (BH) of the user, beside the head and hand left side (BHHL), beside the head and hand right side (BHHR). Other reasons can cause the overall antenna radiating efficiency to become less than the efficient of another antenna aperture tuning state. If the best antenna aperture tuning state is different from the current antenna aperture tuning state, at 545 the current antenna aperture tuning state is changed to the determined best state. The process returns to 510 to wait for the next antenna impedance measurement to be initiated.

In some embodiments, further fine tuning is performed when the antenna aperture tuning state is changed. The RF communication device may include an impedance matching circuit that is tunable, such as by adjusting a tunable capacitor of the impedance matching circuit for example. Further aperture tuning may be performed with coarse aperture state tuning. The coarse aperture tuning states are realized by RF switches, while fine aperture tuning is realized using tunable capacitors or tunable inductors with fine tuning capability. A lookup table may be created for the coarse aperture tuning states, and the fine aperture tuning is realized by monitoring the reflection coefficient and by a comparison with a predetermined value for a desired figure of merit parameter. The figure of merit parameter can be used as feedback for adjustment of the capacitance value of the tunable capacitor by the processor.

In some embodiments, only fine tuning is included under closed loop control by a processor. An initial antenna aperture tuning state may be selected (e.g., by a lookup table) from a few coarse tuning states based on one or more operating parameters such as RAT, band, frequency and use case. After the initial antenna aperture tuning state is set, the processor fine tunes one or more adjustable circuit components of the impedance matching circuit to optimize the figure of merit parameter. In some embodiments, the fine tuning is realized by monitoring a reflection coefficient and adjusting the one or more circuit components to adjust the reflection coefficient toward a predetermined value.

The several examples described provide solutions to optimize antenna efficiency for all frequency bands under changing conditions in which the RF device is used. The RF device accomplishes this by reconfiguring the antenna aperture in real time.

Additional Description and Examples

Example 1 includes subject matter (such as an apparatus) comprising a radio frequency (RF) antenna circuit; an antenna aperture tuning circuit; an antenna impedance measurement circuit; and a processor circuit electrically coupled to the tunable antenna aperture circuit and the impedance measurement circuit, wherein the processor circuit is configured to: set the antenna aperture tuning circuit to an antenna aperture tuning state according to one or more parameters of an RF communication network; initiate an antenna impedance measurement to obtain an antenna impedance; and adjust the antenna aperture tuning state as a function of the antenna impedance.

In Example 2, the subject matter of Example 1 optionally includes an antenna aperture tuning circuit that includes one or more of: an inductor coupled to the RF antenna circuit by an RF switch, a capacitor coupled to the RF antenna circuit by an RF switch, at least a first antenna radiating element coupled to a second antenna radiating element by an RF switch, an antenna radiating element coupled to a circuit ground by an RF switch; and wherein the processor circuit is configured to set the antenna aperture tuning state by configuring one or more RF switches of the antenna aperture tuning circuit.

In Example 3, the subject matter of one or both of Examples 1 and 2 optionally includes an antenna aperture tuning circuit that includes one or more of: at least a first antenna radiating element coupled to a second antenna radiating element by a tunable capacitor; and an antenna radiating element coupled to a circuit ground by a tunable capacitor; and wherein the processor circuit is configured to set the antenna aperture tuning state by setting the capacitance value of one or more tunable capacitors.

In Example 4, the subject matter of one or any combination of Examples 1-3 optionally includes an impedance matching circuit electrically coupled to the RF antenna circuit, wherein the processor circuit is optionally configured to change impedance of the impedance matching circuit to change transducer gain of the RF antenna circuit when the antenna aperture tuning state is set to the antenna aperture tuning state indicated by the antenna impedance.

In Example 5, the subject matter of one or any combination of Examples 1-4 optionally includes a memory circuit configured to store a lookup table that includes antenna aperture tuning states indexed according to antenna impedance, wherein the processor circuit is configured to set the antenna aperture tuning state using the lookup table.

In Example 6, the subject matter of one or any combination of Examples 1-5 optionally includes an adjustable capacitor electrically coupled between one of a radiating element and circuit ground, or a first radiating element and a second radiating element, wherein the processor circuit is configured to set the antenna aperture tuning state by changing a capacitance value of the adjustable capacitor.

In Example 7, the subject matter of one or any combination of Examples 1-6 optionally includes a transmit power measurement circuit configured to determine a measure of transmit power, and wherein the processor circuit is configured to initiate a measurement of transmit power, and initiate the antenna impedance measurement conditional upon the measurement of transmit power satisfying a specified measurement transmit power threshold.

In Example 8, the subject matter of one or any combination of Examples 1-7 optionally includes an antenna impedance measurement circuit configured to determine magnitude and phase of a forward signal and a reverse signal of a transmit signal, and wherein the processor circuit is configured to determine the antenna impedance measurement using a difference in phase between the forward signal and the reverse signal, and a ratio including the magnitudes of the forward signal and the reverse signals.

In Example 9, the subject matter of one or any combination of Examples 1-8 optionally includes a processor circuit configured to recurrently initiate the measurement of antenna impedance according to a specified schedule, and change the antenna aperture tuning state according to the determined antenna impedance.

In Example 10, the subject matter of one or any combination of Examples 1-9 optionally includes a processor circuit configured to set the aperture tuning circuit to an antenna aperture tuning state and initiate the measurement of antenna impedance when detecting a change in the one or more parameters of the RF communication network.

In Example 11, the subject matter of one or any combination of Examples 1-10 optionally includes a processor circuit configured to set the antenna aperture tuning circuit to an antenna aperture tuning state according to one or more parameters that include one or more of a radio access technology (RAT) of the RF communication network, a channel of the RF communication network, and bandwidth of the RF communication network.

Example 12 includes subject matter (such as a computer readable storage medium including instructions that when performed by processing circuitry of an RF communication device, cause the RF communication device to perform specified operations), or can optionally be combined with the subject matter of one or any combination of Examples 1-11 to include such subject matter, comprising setting an antenna aperture tuning state according to one or more parameters of the RF communication network; determining antenna impedance; and changing the antenna aperture tuning state according to the determined antenna impedance.

In Example 13, the subject matter of Example 12 optionally includes one or more of: changing an RF coupling state of a first antenna radiating element to a second radiating element, changing an RF coupling state of an antenna radiating element to ground, changing an RF coupling state of an antenna radiating element to an inductor of an antenna circuit of the RF circuitry, changing an RF coupling state of an antenna radiating element to a capacitor of the antenna circuit, and changing an RF coupling location of a ground leg of an RF antenna circuit of the RF circuitry.

In Example 14, the subject matter of one or both of Examples 12 and 13 optionally include tuning an impedance matching circuit to change transducer gain of an RF antenna circuit of the RF circuitry in addition to changing the antenna aperture tuning state.

In Example 15, the subject matter of one or any combination of Examples 12-14 optionally includes identifying an antenna aperture tuning state using a lookup table that includes specified antenna aperture tuning states indexed according to antenna impedance, and setting the antenna aperture tuning state to a specified antenna aperture tuning state identified using the lookup table.

In Example 16 the subject matter of one or any combination of Examples 12-15 optionally includes setting the antenna aperture tuning state by adjusting a capacitance value of a capacitor, wherein the capacitor is electrically coupled between one of a radiating element and circuit ground, or a first radiating element and a second radiating element.

In Example 17, the subject matter of one or any combination of Examples 12-16 optionally includes determining the magnitude of transmit power, wherein the determining antenna impedance is conditional upon the determined magnitude of transmit power satisfying a specified threshold magnitude value.

In Example 18, the subject matter of one or any combination of Examples 12-17 optionally include determining magnitude and phase of a transmit signal from a forward direction and a reverse direction, and determining the antenna impedance using a difference in phase between the transmit signal in the forward direction and the reverse direction, and a ratio including the magnitudes of the transmit signal in the forward direction and the reverse direction.

Example 19, can include subject matter (such as a method of operating an ambulatory medical device, a means for performing acts, or a machine-readable medium including instructions that, when performed by the machine, cause the machine to perform acts), or can optionally be combined with the subject matter of one or any combination of Examples 1-18 to include such subject matter, comprising setting an antenna aperture tuning state according to parameters of the RF communication network; determining antenna impedance; determining a figure of merit parameter for the antenna aperture tuning state using the antenna impedance; and changing the antenna aperture tuning state according to the figure of merit parameter.

In Example 20, the subject matter of Example 19 optionally includes a computer readable storage medium including instructions to cause processing circuitry of the RF communication device to select an antenna aperture tuning state using a lookup table that includes antenna aperture tuning states indexed according to antenna impedance, and set the antenna aperture tuning state to the selected antenna aperture tuning state.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus comprising:
   a radio frequency (RF) antenna circuit;
   an antenna aperture tuning circuit;
   an antenna impedance measurement circuit; and
   a processor circuit electrically coupled to the tunable antenna aperture circuit and the impedance measurement circuit, wherein the processor circuit is configured to execute computer instructions stored in memory to:
   set the antenna aperture tuning circuit to an antenna aperture tuning state according to one or more parameters of an RF communication network, wherein the one or more parameters of the RF communication network include a radio access technology (RAT) of the RF communication network, a channel of the RF communication network, or bandwidth of the RF communication network;
   recurrently initiate the measurement of antenna impedance according to a specified schedule to obtain an antenna impedance; and
   change the antenna aperture tuning state according to the determined antenna impedance.

2. The apparatus of claim 1, wherein the antenna aperture tuning circuit includes one or more of:
   an inductor coupled to the RF antenna circuit by an RF switch, a capacitor coupled to the RF antenna circuit by an RF switch, at least a first antenna radiating element coupled to a second antenna radiating element by an RF switch, an antenna radiating element coupled to a circuit ground by an RF switch; and
   wherein the processor circuit is configured to set the antenna aperture tuning state by configuring one or more RF switches of the antenna aperture tuning circuit.

3. The apparatus of claim 1, wherein the antenna aperture tuning circuit includes one or more of:
   at least a first antenna radiating element coupled to a second antenna radiating element by a tunable capacitor; and
   an antenna radiating element coupled to a circuit ground by a tunable capacitor; and
   wherein the processor circuit is configured to set the antenna aperture tuning state by setting the capacitance value of one or more tunable capacitors.

4. The apparatus of claim 1, including an impedance matching circuit electrically coupled to the RF antenna circuit, wherein the processor circuit is configured to change impedance of the impedance matching circuit to change transducer gain of the RF antenna circuit when the antenna aperture tuning state is set to the antenna aperture tuning state indicated by the antenna impedance.

5. The apparatus of claim 1, including a memory circuit configured to store a lookup table that includes antenna aperture tuning states indexed according to antenna impedance, wherein the processor circuit is configured to set the antenna aperture tuning state using the lookup table.

6. The apparatus of claim 1, including an adjustable capacitor electrically coupled between one of a radiating element and circuit ground, or a first radiating element and a second radiating element, wherein the processor circuit is configured to set the antenna aperture tuning state by changing a capacitance value of the adjustable capacitor.

7. The apparatus of claim 1, including a transmit power measurement circuit configured to determine a measure of transmit power, and wherein the processor circuit is configured to initiate a measurement of transmit power, and initiate the antenna impedance measurement conditional upon the measurement of transmit power satisfying a specified measurement transmit power threshold.

8. The apparatus of claim 1, wherein the antenna impedance measurement circuit is configured to determine magnitude and phase of a forward signal and a reverse signal of a transmit signal, and wherein the processor circuit is configured to determine the antenna impedance measurement using a difference in phase between the forward signal and the reverse signal, and a ratio including the magnitudes of the forward signal and the reverse signals.

9. The apparatus of claim 1, wherein the processor circuit is configured to set the aperture tuning circuit to an antenna aperture tuning state and initiate the measurement of antenna impedance when detecting a change in the one or more parameters of the RF communication network.

10. The apparatus of claim 1, wherein the antenna tuning circuit includes a first tuning port coupled to the RF antenna circuit at a first RF coupling location and a second tuning port coupled to the RF antenna circuit at a second RF coupling location, the tuning ports each including an RF switch, and wherein the processor circuit is configured to set the antenna aperture tuning state by configuring the RF switches of the first tuning port and second tuning port.

11. A computer readable storage medium including instructions, that when performed by processing circuitry of an RF communication device, cause the RF communication device to perform acts comprising:
   setting an antenna aperture tuning state according to one or more parameters of the RF communication network, wherein the one or more parameters of the RF communication network include a radio access technology (RAT) of the RF communication network, a channel of the RF communication network, or bandwidth of the RF communication network:
   determining antenna impedance; and
   changing the antenna aperture tuning state according to the determined antenna impedance by one or more of:
   changing an RF coupling state of a first antenna radiating element to a second radiating element, changing an RF coupling state of an antenna radiating element to ground, changing an RF coupling state of an antenna radiating element to an inductor of an antenna circuit of the RF circuitry, changing an RF coupling state of an antenna radiating element to a capacitor of the antenna circuit, and changing an RF coupling location of a ground leg of an RF antenna circuit of the RF circuitry.

12. The computer readable storage medium of claim 11, including instructions that cause the RF communication device to perform acts comprising tuning an impedance matching circuit to change transducer gain of an RF antenna circuit of the RF circuitry in addition to changing the antenna aperture tuning state.

13. The computer readable storage medium of claim 11, including instructions that cause the RF communication device to perform acts comprising changing the antenna aperture tuning state by identifying an antenna aperture tuning state using a lookup table that includes specified antenna aperture tuning states indexed according to antenna impedance, and setting the antenna aperture tuning state to a specified antenna aperture tuning state identified using the lookup table.

14. The computer readable storage medium of claim 11, including instructions that cause the RF communication device to perform acts comprising setting the antenna aperture tuning state by adjusting a capacitance value of a capacitor, wherein the capacitor is electrically coupled between one of a radiating element and circuit ground, or a first radiating element and a second radiating element.

15. The computer readable storage medium of claim 11, including instructions that cause the RF communication device to perform acts comprising determining magnitude of transmit power, wherein the determining antenna impedance is conditional upon the determined magnitude of transmit power satisfying a specified threshold magnitude value.

16. The computer readable storage medium of claim 11, including instructions that cause the RF communication device to perform acts comprising determining magnitude and phase of a transmit signal from a forward direction and a reverse direction, and determining the antenna impedance using a difference in phase between the transmit signal in the forward direction and the reverse direction, and a ratio including the magnitudes of the transmit signal in the forward direction and the reverse direction.

17. A method of operating radio frequency (RF) circuitry to communicate via an RF communication network, the method comprising:
   setting an antenna aperture tuning state according to parameters of the RF communication network,
   determining antenna impedance:
   selecting an antenna aperture tuning state using a lookup table that includes antenna aperture tuning states indexed according to antenna impedance; and
   measuring the antenna impedance and setting the aperture tuning circuit to the selected antenna aperture tuning state when detecting a change in one or more parameters of the RF communication network.

* * * * *